(12) United States Patent
Corr et al.

(10) Patent No.: US 10,818,486 B2
(45) Date of Patent: Oct. 27, 2020

(54) SYSTEM FOR MINIMIZING ELECTRICAL DISCHARGE DURING ESI OPERATION

(71) Applicant: DH Technologies Development Pte. Ltd., Singapore (SG)

(72) Inventors: John J. Corr, Richmond Hill (CA); Thomas R. Covey, Newmarket (CA); Peter Kovarik, Markham (CA)

(73) Assignee: DH Technologies Development Pte. Ltd., Singapore (SG)

( * ) Notice: Subject to any disclaimer, the term of this patent is extended or adjusted under 35 U.S.C. 154(b) by 9 days.

(21) Appl. No.: 16/062,936

(22) PCT Filed: Dec. 8, 2016

(86) PCT No.: PCT/IB2016/057430
§ 371 (c)(1),
(2) Date: Jun. 15, 2018

(87) PCT Pub. No.: WO2017/103743
PCT Pub. Date: Jun. 22, 2017

(65) Prior Publication Data
US 2019/0006165 A1    Jan. 3, 2019

Related U.S. Application Data

(60) Provisional application No. 62/269,654, filed on Dec. 18, 2015.

(51) Int. Cl.
*H01J 49/16* (2006.01)
*H01J 49/04* (2006.01)
*G01N 30/72* (2006.01)

(52) U.S. Cl.
CPC .......... *H01J 49/165* (2013.01); *G01N 30/72* (2013.01); *G01N 30/7266* (2013.01); *H01J 49/044* (2013.01); *H01J 49/0477* (2013.01)

(58) Field of Classification Search
CPC .......................... H01J 49/165; H01J 49/0477
See application file for complete search history.

(56) References Cited

U.S. PATENT DOCUMENTS 5,412,208 A * 5/1995 Covey ............... G01N 30/7246
250/281
2002/0125423 A1   9/2002 Ebeling
(Continued)

FOREIGN PATENT DOCUMENTS

JP   2009025260 A   2/2009

OTHER PUBLICATIONS

International Search Report and Written Opinion for PCT/US2016/057430 dated Mar. 16, 2017.

*Primary Examiner* — Eliza W Osenbaugh-Stewart (57) ABSTRACT

Methods and systems are provided for reducing the occurrence of unwanted electrical discharge when operating an electrospray ion source to generate ions for mass spectrometric analysis. In accordance with various aspects of the applicant's teachings, the methods and systems described herein can provide for controlling the ion emission current so as to limit the onset of avalanche of electrical discharge between the electrospray electrode and the counter electrode under ionization conditions that typically tend to increase the likelihood of such discharge (arcing), while nonetheless providing for maximal ionization efficiency. In various aspects, emission currents between the electrospray electrode and the counter electrode through which the ions are transmitted to a downstream mass analyzer can be maintained at elevated levels, below 10 µA, for example, without the electric potential between the electrospray electrode and the counter electrode initiating the electrical discharge avalanche that results from the dielectric breakdown of the air (Continued)

gap therebetween, which can cause sputtering and effect the long-term operation of the ESI source.

17 Claims, 7 Drawing Sheets

(56) References Cited

U.S. PATENT DOCUMENTS

| | | | |
|---|---|---|---|
| 2005/0258360 A1* | 11/2005 | Whitehouse | B01D 61/00 250/288 |
| 2007/0007448 A1 | 1/2007 | Wang | |
| 2008/0203198 A1* | 8/2008 | Staats | H01J 49/165 239/690.1 |
| 2009/0095899 A1* | 4/2009 | Whitehouse | H01J 49/165 250/282 |
| 2011/0220787 A1 | 9/2011 | Shiea | |
| 2014/0103207 A1 | 4/2014 | Sampei | |
| 2015/0338384 A1* | 11/2015 | Stevens | H01J 49/0422 250/424 |

* cited by examiner

SYSTEM FOR MINIMIZING ELECTRICAL DISCHARGE DURING ESI OPERATION

RELATED US APPLICATIONS

This application claims the benefit of priority from US Provisional Application Ser. No. 62/269,654, filed on Dec. 18, 2015, the entire contents of which is incorporated by reference herein.

FIELD

The invention generally relates to mass spectrometry, and more particularly and without limitation, to methods and apparatus for reducing the occurrence of unwanted electrical discharge when operating an electrospray ion source to generate ions for mass spectrometric analysis.

INTRODUCTION

Mass spectrometry (MS) is an analytical technique for determining the elemental composition of test substances with both qualitative and quantitative applications. MS can be useful for identifying unknown compounds, determining the isotopic composition of elements in a molecule, determining the structure of a particular compound by observing its fragmentation, and quantifying the amount of a particular compound in a sample.

Over the years, various sampling techniques have been developed to convert the chemical entities within a liquid sample into charged ions suitable for detection with MS. One of the more common ionization methods is electrospray ionization (ESI) (e.g., pneumatic assisted electrospray, nano-electrospray) due to its ability to transfer molecules, including large macromolecules from solution into the gas-phase as intact multiply-charged molecular ions and the ease with which it may be coupled to various sample sources including liquid chromatography and capillary electrophoresis, for example. Typically in ESI, a liquid sample is discharged into an ionization chamber via an electrically conductive needle or nozzle, while an electric potential difference between the sample needle and a counter electrode generates a strong electric field within the ionization chamber that electrically charges the liquid sample. This electric field causes the liquid discharged from the needle or nozzle to disperse into a plurality of charged micro-droplets drawn toward the counter electrode if the charge imposed on the liquid's surface is strong enough to overcome the surface tension of the liquid (i.e., the particles attempt to disperse the charge and return to a lower energy state). As solvent within the micro-droplets evaporates during desolvation in the ionization chamber, charged analyte ions can then enter a sampling orifice of the counter electrode for subsequent mass spectrometric analysis.

During operation of an ESI source, the tip of the electrically conductive needle or nozzle may enter into an avalanche of unwanted electrical discharge (e.g., arcing) between the sample needle and the counter electrode due to a decrease in the resistance across the gap, thereby increasing the electrical current. When the ionization chamber and/or the needle is heated to promote the desolvation of the solvent within the micro-droplets, this problem can be further exacerbated due to a reduction in the resistance of the air gap. As the discharge current grows, the signal stability deteriorates and eventually leads to a decrease in the signal intensity. Because the problem of unwanted electrical discharge can be especially noticeable at micro-flow regimes, it is not uncommon that the ion source is operated at sub-maximum ionization efficiency by reducing the strength of the electric field (e.g., maintaining the voltage applied to the sample needle at a value less than the threshold voltage of discharge onset) or by reducing the desolvation heat to avoid the onset of the discharge.

In conventional ESI, the sample needle is traditionally comprised of a metallic capillary (e.g., stainless steel) from which the liquid sample is discharged into the ionization chamber and to which a voltage of several kilovolts is applied relative to the counter electrode. As ESI-based techniques have increasingly emphasized ionization efficiency and/or reduced sample consumption (e.g., by reducing the size of the sample needle to decrease volumetric flow rates of the liquid sample), manufacturing constraints on the size of metallic capillaries have led to the use of metallized silica capillaries. For example, silica capillaries can be pulled under heat to produce tapered emitters with relatively smaller inner diameters (IDs), which can then be coated with a thin layer of conductive material (e.g., gold). Whereas it is generally difficult to produce a stainless steel capillary having an ID less than about 70 μm, metallized silica capillaries can exhibit IDs as low as 10 μm, by way of non-limiting example. However, under these conditions, the possibility of unwanted electrical discharge between the sample needle and the counter electrode can become even more likely due to the concentration of the electric field at needle tips of relatively-smaller diameters. In addition to the problems associated with unwanted electrical discharge noted above, the low temperature plasma generated at the tip of metallized silica capillaries during the electrical discharge can quickly erode the metal coating, thereby leading to decreased operating lifetime and poor durability of the sample needle.

Accordingly, there remains a need for improved methods and systems for minimizing electrical discharge during operation of ESI sources.

SUMMARY

The present teachings generally relate to methods and systems for reducing unwanted electrical discharge when operating an electrospray ion source to generate ions for mass spectrometric analysis.

In accordance with various aspects of the applicant's teachings, methods and systems are described herein that provide for controlling the ion emission current so as to limit the onset of avalanche of electrical discharge between the electrospray electrode and the counter electrode under ionization conditions that typically tend to increase the likelihood of such discharge (arcing). By way of non-limiting example, methods and systems in accordance with some aspects of the present teachings can maintain the electrospray electrode at high voltages (e.g., greater than about 4000 V) while the ionization chamber is maintained at elevated temperatures (e.g., between about 200° C. to about 800° C.) so as to provide maximal ionization efficiency, while nonetheless reducing the risk of unwanted electrical discharge. In various aspects, emission currents between the electrospray electrode and the counter electrode through which the ions are transmitted to a downstream mass analyzer can be maintained at elevated levels, below 10 μA, for example, without the electric potential between the electrospray electrode and the counter electrode initiating the electrical discharge avalanche that results from the dielectric breakdown of the air gap therebetween, which can cause sputtering and effect the long-term operation of the ESI source. In various aspects, the ion emission current can be controlled without monitoring and/or modifying (e.g., reducing) the voltage applied by a power source as the conditions within the ionization chamber increase the potential for electrical discharge. In various aspects, ion sources in accordance with the present teachings can be placed downstream of an LC column and operated to provide efficient ionization of the liquid sample throughout the elution gradient of a plurality of solvents, without requiring that the voltage of the electrospray be modified throughout the elution and/or without programming the supplied voltage throughout the elution gradient to prevent the onset of electrical discharge under particular elution/ionization conditions at a particular elution time, for example.

In accordance with various aspects, certain embodiments of the applicant's teachings relate to an electrospray ion source assembly for generating ions for analysis by a mass spectrometer, the assembly comprising an ion source housing defining an ionization chamber, the ionization chamber configured to be disposed in fluid communication with a sampling orifice formed in (e.g., extending through) a counter electrode of a mass spectrometer system. The system also includes an electrospray electrode that defines an axial bore for transmitting a liquid sample received from a sample source at an inlet end of the electrospray electrode to an outlet end for discharging the liquid sample from the electrospray electrode into the ionization chamber. Additionally, the exemplary system includes a power source configured to provide an electrical power to an electrical circuit containing the electrospray electrode and the counter electrode so as to generate an ion emission current (i.e., a current carried by electrons and ions generated via ionization) between the electrospray electrode and the sampling orifice and an ion emission current controller configured to limit the onset of electrical discharge between the electrospray electrode and the counter electrode (e.g., arcing, Townsend discharge). In various aspects, the system can include one or more of a heater for heating the ionization chamber or a nebulizer probe having a conduit through which the electrospray electrode at least partially extends for providing a nebulizer gas at the outlet end of the electrospray electrode. By way of non-limiting example, the heater can maintain the temperature of the ionization chamber in a range of about 30° C. to about 800° C. so as to promote the desolvation of the micro-droplets within the liquid sample plume discharged from the outlet end of the electrospray electrode. The electrospray electrode can comprise any of a metallic conductive conduit or a metal coated silica conduit. For example, the electrospray electrode can comprise a metallized silica capillary having an inner diameter less than about 70 µm, by way of non-limiting example. In some aspects, the shape of the outlet end of the electrospray electrode is controlled so as to provide a substantially uniform electric field thereat.

The ion emission current controller can have a variety of configurations in accordance with various aspects of the present teachings. By way of example, in some aspects the ion emission current controller can comprise one or more (e.g., a plurality of) current limiting resistors disposed in series in the electrical circuit between the power source and the electrospray electrode. In related aspects, the current limiting resistors can exhibit a total resistance in a range from about 1 to 3 GΩ. Additionally or alternatively, the current limiting resistors can exhibit a total resistance in a range from about 20% to about 100% of the resistance of the air gap between the electrospray electrode and the counter electrode under normal operating conditions of the ion source (e.g., conditions in which ion emission current is generated without electrical discharge between the electrospray electrode and the counter electrode). In some aspects, the ion emission current controller can additionally or alternatively comprise a shunt electrode disposed upstream from the inlet end of the electrospray electrode and in electrical communication with the liquid sample, wherein at least a portion of the electrical current between the electrospray electrode and the sampling orifice is diverted to the shunt electrode (e.g., via the liquid sample). In related aspects, the value of the diverted current can be based on the conductivity of the portion of the liquid sample between the electrospray electrode and the shunt electrode. In some related aspects, for example, the liquid sample source can be a liquid chromatography (LC) column and the liquid sample can comprise an eluent therefrom, wherein changes in the conductivity of the eluent produced during gradient LC elution controls the value of diverted current between the electrospray electrode and the shunt electrode. In various aspects, the shunt electrode can be grounded and/or a distance between the shunt electrode and the electrospray electrode is based on the conductivity of the liquid sample. In various aspects, the ion emission current controller can comprise a plurality of shunt electrodes disposed at different distances upstream from the inlet end of the electrospray electrode, wherein one of the plurality of the shunt electrodes is selectively grounded based on the conductivity of the liquid sample. Additionally or alternatively, in some aspects, the ion emission current controller can comprise an actuator configured to move the shunt electrode so as to adjust a distance between the shunt electrode and the electrospray electrode.

In various aspects, the power source of the electrospray ion source assembly can be configured to provide an electric potential to the electrospray electrode greater than about 2000V (e.g., in a range of about 2000-8000 V DC). Additionally or alternatively, in some aspects the ion emission current controller can be maintained below about 10 µA. By way of non-limiting example, the emission current can be maintained in a range of about 0.5 µA to about 10 µA. In various aspects, the flow rate of the liquid sample from the electrospray electrode can be maintained in a range of less than 1 mL/min.

In accordance with various aspects of the present teachings, certain embodiments of the applicant's teachings relate to a mass spectrometer system, the system comprising a liquid chromatography (LC) column for providing a liquid sample to be analyzed; an electrospray ion source in fluid communication with the LC column, the electrospray ion source having an ion source housing defining an ionization chamber; at least one heater for heating the ionization chamber; and an electrospray electrode defining an axial bore therethrough for transmitting a liquid sample received from a sample source at an inlet end of the electrospray electrode to an outlet end for discharging the liquid sample from the electrospray electrode into the ionization chamber. The system can also comprise a mass analyzer for analyzing the ions generated by the ion source, wherein the ions are received by the mass analyzer through a sampling orifice in a counter electrode, the sampling orifice being in fluid communication with the ionization chamber. A power source is configured to provide an electrical voltage to an electrical circuit containing the electrospray electrode and the counter electrode so as to generate an ion emission current between the electrospray electrode and the sampling orifice as at least a portion of the liquid sample is ionized upon being discharged from the electrospray electrode. Additionally, the system can include an ion emission current controller configured to prevent arcing between the electrospray electrode and the counter electrode without substantially altering the electrical potential (voltage, electromotive force) provided to the electrical circuit by the power source (e.g., without changing the amplitude of the voltage by more than 5%, typically operated at constant voltage or 0% change), wherein the ion emission current controller comprises a shunt electrode disposed between the LC column and the outlet end of the electrospray electrode, the shunt electrode configured to be in electrical communication with the liquid sample, wherein at least a portion of the electrical current between the power source and the electrospray electrode is diverted to the shunt electrode based on the conductivity of the portion of the liquid sample between the conductive part of the electrospray electrode and the shunt electrode; and one or more current limiting resistors disposed in series in the electrical circuit between the power source and the electrospray electrode, the one or more current limiting resistors exhibiting a total resistance in a range from about 20% to about 100% of the resistance of the air gap between the electrospray electrode and the counter electrode under normal, non-electrical discharge conditions of the ion source. In some aspects, for example, the current limiting resistors can exhibit a total resistance in a range from about 1 to 3 GΩ. In various aspects, the ion emission current controller can maintain the ion emission current below about 10 µA without substantially altering the voltage provided by the power source.

In accordance with various aspects of the present teachings, certain embodiments of the applicant's teachings relate to a method for operating an electrospray ion source of a mass spectrometer system, the method comprising: transmitting a liquid sample from an inlet end of an electrospray electrode to an outlet end of the electrospray electrode, the outlet end being disposed in an ionization chamber so as to discharge the liquid sample from the outlet end of the electrospray electrode into the ionization chamber, the ionization chamber being in fluid communication with a sampling orifice formed in (e.g., extending through) a counter electrode of a mass spectrometer system; heating the ionization chamber; operating a power source to provide an electrical voltage to an electrical circuit containing the electrospray electrode and the counter electrode so as to generate an ion emission current between the electrospray electrode and the sampling orifice as at least a portion of the liquid sample is ionized upon being discharged from the electrospray electrode; and controlling the ion emission current so as to limit the onset of electrical discharge between the electrospray electrode and the counter electrode without substantially altering the electrical voltage (potential difference, electromotive force) provided to the electrical circuit by the power source. In some aspects, the emission current can be maintained in a range of about 0.5 µA to about 10 µA (e.g., in a range between about 0.5 µA to about 3 µA), while the flow rate of the liquid sample from the electrospray electrode can be maintained in a range of less than 1 mL/min (e.g., in a range of about 1 µL/min to about 100 µL/min).

The ion emission current can be controlled in a variety of manners in accordance with various aspects of the present teachings. By way of example, one or more current limiting resistors disposed in series in the electrical circuit between the power source and the electrospray electrode can limit the onset of electrical discharge. In some related aspects, the one or more current limiting resistors can exhibit a total resistance in a range from about 1 to 3 GΩ. Additionally or alternatively, the one or more current limiting resistors exhibit a total resistance in a range from about 20% to about 100% of the resistance of the air gap between the electrospray electrode and the counter electrode under normal operating conditions of the ion source in which ion emission current is generated without electrical discharge between the electrospray electrode and the counter electrode.

In various aspects, the ion emission current can additionally or alternatively be controlled via a shunt electrode disposed upstream from the inlet end of the electrospray electrode and in electrical communication with the liquid sample that is configured to limit the onset of electrical discharge by diverting at least a portion of the electrical current between the electrospray electrode and the sampling orifice to the shunt electrode. In related aspects, for example, a distance between the shunt electrode and the electrospray electrode can be adjusted so as to adjust the diverted current. By way of example, the distance can be based on the conductivity of the liquid sample.

These and other features of the applicant's teachings are set forth herein.

BRIEF DESCRIPTION OF THE DRAWINGS

The skilled person in the art will understand that the drawings, described below, are for illustration purposes only. The drawings are not intended to limit the scope of the applicant's teachings in any way.

DETAILED DESCRIPTION

It will be appreciated that for clarity, the following discussion will explicate various aspects of embodiments of the applicant's teachings, while omitting certain specific details wherever convenient or appropriate to do so. For example, discussion of like or analogous features in alternative embodiments may be somewhat abbreviated. Well-known ideas or concepts may also for brevity not be discussed in any great detail. The skilled person will recognize that some embodiments of the applicant's teachings may not require certain of the specifically described details in every implementation, which are set forth herein only to provide a thorough understanding of the embodiments. Similarly it will be apparent that the described embodiments may be susceptible to alteration or variation according to common general knowledge without departing from the scope of the disclosure. The following detailed description of embodiments is not to be regarded as limiting the scope of the applicant's teachings in any manner. As used herein, the terms "about" and "substantially equal" refer to variations in a numerical quantity that can occur, for example, through measuring or handling procedures in the real world; through inadvertent error in these procedures; through differences in the manufacture, source, or purity of compositions or reagents; and the like. Typically, the terms "about" and "substantially equal" as used herein means greater or lesser than the value or range of values stated by $\frac{1}{10}$ of the stated values, e.g., ±10%. For instance, a concentration value of about 30% or substantially equal to 30% can mean a concentration between 27% and 33%. The terms also refer to variations that would be recognized by one skilled in the art as being equivalent so long as such variations do not encompass known values practiced by the prior art.

Figure 1:
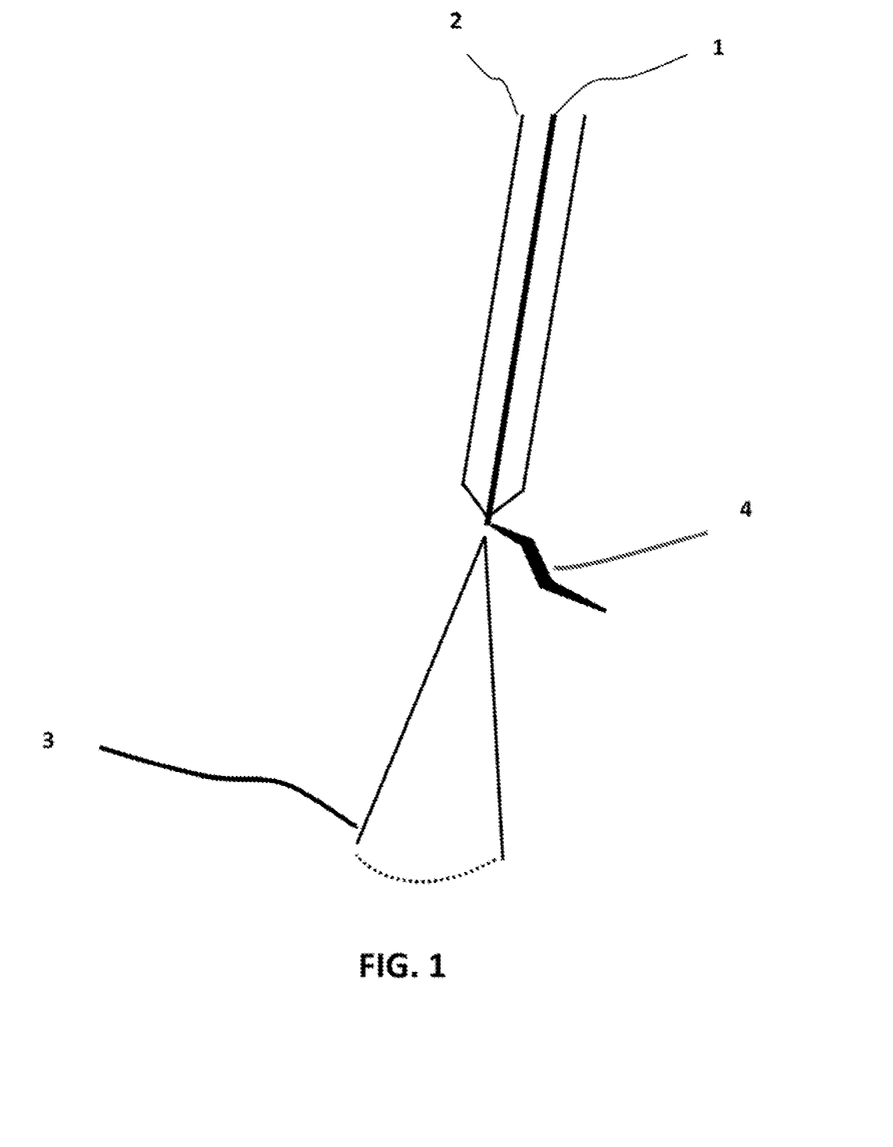
FIG. 1 illustrates the glow discharge between a sample needle of an ion source and a counter electrode of a MS system.

As shown in the annotated schematic of FIG. 1, a typical electrospray ion source comprises a sample needle 1 that extends through a conduit in a nebulizer 2 into the ionization chamber. The liquid sample is sprayed into the ionization chamber in a generally conical shape 3 along the longitudinal axis of the sample needle. When the sample needle is energized through the application of an ion source voltage (ISV) (e.g., a DC voltage), molecules within the liquid sample become electrically charged as the liquid sample is dispersed into the ionization chamber, thereby forming a plurality of charged micro-droplets. Additionally, the electric potential difference between the sample needle and the curtain plate (e.g., which can be maintained at 0 V DC or some other DC value) generates an electric field within the ionization chamber that acts to bend the micro-droplets (and charged analyte ions contained therein) out of the fluid stream toward the curtain plate, thereby generating an ion emission current across the gap between the sample needle and the current plate. However, when the electric field becomes too strong and/or the ion emission current is not sufficiently controlled, an avalanche of visible electrical discharge 4 (Townsend discharge) or arcing between the sample needle and the curtain plate can result due to the breakdown of the dielectric strength/resistance across the gap between the outlet of the sample needle and the counter electrode. As the discharge current grows, the signal stability can deteriorate and can lead to a decrease in the signal intensity. Because unwanted electrical discharge can be especially problematic at micro-flow regimes, conventional ion sources typically utilize active control of the ISV and/or are operated at sub-optimal ionization efficiencies to avoid the onset of unwanted electrical discharge. By way of example, in conventional methods and systems in which a liquid sample is an eluent from a high-performance liquid chromatography (HPLC) column operating with a gradient elution, electrospray ion sources are generally operated at a reduced (sub-optimal), constant ISV throughout the entire elution so as to prevent unwanted electrical discharge at times during the elution when the solvent is particularly conductive. In accordance with various aspects of the applicant's teachings, however, methods and systems are described herein for controlling the ion emission current during electrospray ionization (ESI) so as to prevent and/or reduce the likelihood of unwanted electrical discharge between the sample needle from which a sample fluid is discharged and a counter electrode defining an orifice through which ions are transmitted into the mass spectrometer. By way of non-limiting example, methods and systems in accordance with some aspects of the present teachings can passively adjust or maintain the electrospray electrode at near-optimal ISVs so as to provide maximal ionization efficiency, while nonetheless reducing the risk of unwanted electrical discharge. In various aspects, emission currents between the electrospray electrode and the counter electrode through which the ions are transmitted to a downstream mass analyzer can be maintained at elevated levels up to about 3 µA, for example, without the electric potential between the electrospray electrode and the counter electrode initiating the electrical discharge avalanche that results from the dielectric breakdown of the air gap. In various aspects, the ion emission current can be controlled without monitoring and/or modifying (e.g., reducing) the voltage applied by a power source to the electrical circuit containing the sample needle as changed conditions within the ionization chamber and/or during an elution gradient increase the potential for electrical discharge.

Figure 2:
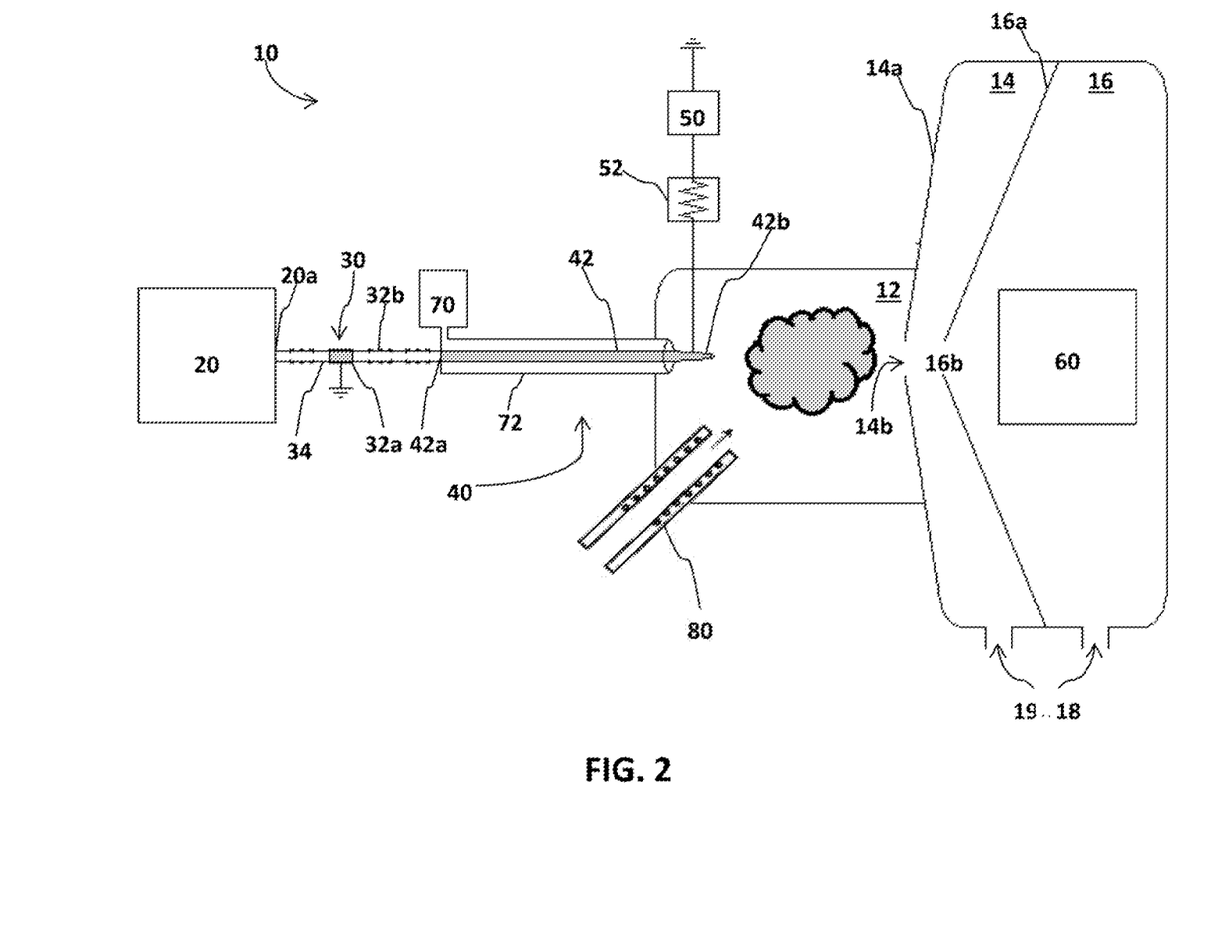
FIG. 2, in a schematic diagram, illustrates an exemplary embodiment of an ion source assembly and a mass spectrometry system in accordance with various aspects of the applicant's teachings.

With reference now to FIG. 2, an exemplary mass spectrometer system 10 in accordance with various aspects of the applicant's teachings is shown. As shown in FIG. 2, the exemplary mass spectrometer system 10 generally comprises a sample source 20 providing a fluid sample to be ionized, an ion source 40, and a mass analyzer 60 for the downstream processing of sample ions. Generally, the ion source 40 comprises an electrospray ion source having a sample needle 42 terminating in a distal end 42b that is configured to spray the liquid sample into a heated ionization chamber 12 in fluid communication with the sampling orifice 14b of a counter electrode or curtain plate 14a of the mass spectrometer. As will be discussed in more detail below, the system 10 additionally includes a power source 50 configured to provide an electrical power to an electrical circuit containing the sample needle 42 so as to ionize molecules within the liquid sample (e.g., analytes of interest) as the liquid sample is discharged (e.g., sprayed) into the ionization chamber. Additionally, as discussed in detail below, the mass spectrometer system includes one or more ion emission current mechanisms for preventing the onset of unwanted electrical discharge between the sample needle 42 and the curtain plate 14a.

As will be appreciated by a person skilled in the art, the system 10 can be fluidly coupled to and receive a liquid sample from a variety of liquid sample sources. By way of non-limiting example, the sample source 20 can comprise a reservoir of the sample to be analyzed or an input port through which the sample can be injected (e.g., manually or via an auto-sampler). Alternatively, also by way of non-limiting example, the sample source 20 can be an LC column (e.g., of an HPLC system) such that the liquid sample to be analyzed can be in the form of an LC eluent. As shown in FIG. 2, for example, the LC column can be fluidically coupled to the ion source 40 such that one or more LC pumps can deliver the eluent from the output end 20a of the LC column to the input end 42a of the sample needle 42 via one or more conduits 34 or other fluidic pathways.

As shown in FIG. 2, the mass spectrometry system 10 can include one or more vacuum chambers within which the ions generated by the ion source 40 can be received and/or processed. By way of example, in the depicted embodiment, the ionization chamber 12 can be separated from a gas curtain chamber 14 by a curtain plate 14a defining a curtain plate aperture or orifice 14b. As shown, a vacuum chamber 16, which houses the mass analyzer 60, can be separated from the curtain chamber 14 by a plate 16a having a vacuum chamber sampling orifice 16b. The ionization chamber 12 can be maintained at an atmospheric pressure, though in some embodiments, the ionization chamber 12 can be evacuated to a pressure lower than atmospheric pressure. The curtain chamber 14 and vacuum chamber 16 can be maintained at a selected pressure(s) by a gas port 19 and evacuation through vacuum pump port 18, respectively. Ions generated by the ion source 40 in the ionization chamber 12 can thus be drawn through orifices 14b, 16b positioned generally along the axis of the mass spectrometer system 10 and can be focused (e.g., via one or more ion lenses) into the mass analyzer 60. It will be appreciated that the mass analyzer 60 can have a variety of configurations but is generally configured to process (e.g., filter, sort, dissociate, detect, etc.) sample ions generated by the ion source 40. By way of non-limiting example, the mass analyzer 60 can be a triple quadrupole mass spectrometer (e.g., having three quadrupoles housed in vacuum chambers evacuated to the same or different pressures), or any other mass analyzer known in the art and modified in accordance with the teachings herein.

In accordance with various aspects of the present teachings, the ion source assembly can additionally include a sheath, within which the ion probe 42 can be at least partially disposed along its length. As shown in FIG. 2, for example, the sheath can comprise a nebulizer shaft 72 that surrounds the sample needle 42 and defines a channel between an inner wall of the nebulizer shaft 72 and an outer wall of the sample needle 42. A source of pressurized gas 70 (e.g. nitrogen, air, or a noble gas) can be coupled to the sheath 72 in order to supply a nebulizing gas flow which surrounds the sample needle's outlet end 42b and interacts with the fluid discharged therefrom to enhance the formation of the sample plume and ion release within the plume, e.g., via the interaction of the high speed nebulizing gas flow and the jet of liquid sample. The nebulizer gas can be supplied at a variety of flow rates, for example, in a range from about 0.1 L/min to about 20 L/min.

In accordance with various aspects of the present teachings, the sample needle 42 can have a variety of configurations but generally comprises a sample conduit for receiving a liquid sample from the sample source 20 at its inlet end 42a and for discharging the liquid sample from its outlet end 42b into the ionization chamber 12. As will be appreciated by a person skilled in the art in light of the present teachings, the outlet end 42b of the sample needle 42 can atomize, aerosolize, nebulize, or otherwise discharge (e.g., spray via a nozzle) the liquid sample into the ionization chamber 12 to form a sample plume comprising the nebulizing gas flow and a plurality of micro-droplets of the liquid sample generally directed toward (e.g., in the vicinity of) the curtain plate aperture 14b.

By way of non-limiting example, the outlet end 42b of the ion probe 42 can be made of a conductive material and electrically coupled via an electrical circuit to a pole of a power source 50 (e.g., a high power voltage supply), while the other pole of the power source 50 can be grounded. As is known in the art, micro-droplets contained within the sample plume 50 can thus be charged by the voltage applied to the outlet end 42b of the ion probe 42 such that the liquid (e.g., solvent) within the droplets evaporates and the generated analyte ions are released and drawn toward and through the aperture 14b. By way of non-limiting example, the sample needle 42 can comprise a conductive material (e.g., a stainless steel capillary) or a metallized silica capillaries. In various aspects, metallized silica capillaries can be preferred as the silica capillaries can first be pulled under heat to produce tapered emitters having a relatively small inner diameters and can then be coated with a thin layer (e.g., about 2000 Angstroms) of conductive material (e.g., gold), as is known in the art. Whereas it is generally difficult to produce a stainless steel capillary having an ID less than about 70 μm, metallized silica capillaries can exhibit IDs as low as 10 μm, by way of non-limiting example.

In accordance with various aspects of the present teachings, the outlet end 42b of metallized silica capillaries for use as sample needles 42 can be configured to reduce the potential for unwanted electrical discharge, extend the lifetime of the metallized silica capillaries, and/or improve the robustness thereof by being shaped (e.g., cleaved, machined etc.) so as to control the concentration of the electrical field at the distal end 42b. It has been found, for example, that the presence of sharp edges (e.g., discontinuities, clean cleavages) can amplify the local electric field at the sample needle's distal end 42b. As a result, the concentrated electric field generated by a sharp-edged distal end 42b can trigger the onset of unwanted electrical discharge at a lower ISV relative to a sample needle exhibiting the same diameter but a more rounded shape at its distal end. In accordance with various aspects of the present teachings, the distal end 42b of the sample needle 42 can therefore be preferably shaped to increase the radius of curvature so as to reduce the concentration of the electric field thereat and extend the range of voltages that can be applied during the ESI process.

Field strength calculations demonstrate that such geometry control can reduce the concentration of the electric field by more than an order of magnitude, as compared to a sharp edge caused by a cleaving tool. Without being bound by any particular theory, the electric field in the gap (e.g., the field close to the curtain plate 14a) can be approximated by a uniform field, such as that created by two parallel plates in which the equipotential field lines are substantially parallel and equally spaced, to yield a field strength of ~2V/μm. Because the mean free path of an electron at atmospheric pressure is about 0.5 μm, electrons generally will not gain sufficient energy to propagate the avalanche process at the locations in the gap near the curtain plate. In other words, the one eV gained between collisions from the electric field is much less than the 10 eV needed to ionize the gas molecules within the air gap between the distal end 42b of the sample needle 42 and the curtain plate 14a. However, in the vicinity of the sample needle 42, the electric field strength is much higher with the electric field lines "compressed" together by a distal end exhibiting a "sharp" geometry. A skilled artisan will appreciate in view of the present teachings that the electric field just outside the electrode tip 42b can be determined based on the applied voltage (ISV) and the shape of the tip 42b. The field strength encountered at the outlet end 42b can be expressed as the electric field (E) just outside a conducting sphere of radius R:

$$E = Q/(4\pi\varepsilon_0 R^2), \text{ where } Q \text{ is the total charge,}$$

Because $V = Q/(4\pi\varepsilon_0 R)$, substituting for Q yields:

$$E = V/R.$$

Therefore, by manufacturing the distal end 42b of a sample needle 42 having a 300 μm outer diameter to maximize the radius of curvature (R) in accordance with the present teachings, the local field strength (E) can be reduced significantly. For example, by shaping the distal end 42b as a half spherical dome (R=150 μm) and with the ISV set to 5 kV, the above equation yields an electric field strength of about 33V/μm. Because the charge is distributed over a hemisphere (rather than a full sphere), the resulting value would be doubled (i.e., 66 eV/μm) for the maximum radius of curvature, while for less rounded geometries (e.g., a cleaved tip) the field will be significantly higher. For example, a distal end 42b exhibiting ¼ the maximum radius of curvature would produce a 4× increase in the field (264 eV/μm). As a result, sample needles 42 having rounded distal ends 42b in accordance with various aspects of the present teachings can be effective to reduce the energy acquired by electrons, thereby reducing the likelihood of initiating a chain of ionizing events that can break down the dielectric gap (e.g., reduce the resistivity) between the sample needle 42 and the curtain plate 14a of the mass spectrometer. Moreover, because sputtering efficiency of the low temperature plasma generated at the tip of metallized silica capillaries during electrical discharge increases with impact energy of the incident particle, the sharper geometry will cause a more rapid erosion of the electrode. Thus, by controlling the sharpness of the distal end 42b (e.g., by controlling or maximizing the radius of curvature for a given diameter of a sample needle 42), the present teachings can enable improved operating lifetime and durability of metallized silica sample needles.

With continued reference to FIG. 2, the exemplary mass spectrometer system 10 can additionally include one or more heaters 80 for heating the ionization chamber 12 to promote desolvation of the liquid (e.g., solvent) within the sample plume. By way of example, the heater(s) 80 can provide a flow of heated gas to the ionization chamber 12 (e.g., heated by heating elements), though the chamber can also be heated directly by one or more heating elements (e.g., coils) disposed therein. In some aspects, the heater(s) 80 can be effective to raise the temperature of the ionization chamber to a temperature in a range of from about 200° C. to about 800° C. The heater(s) 80 and the ion probe 42 can have a variety of configurations, but can in some aspects be generally positioned relative to one another and to the aperture 14b such that the heated gas flow directs the sample plume to the proximity of the aperture 14b. It will be appreciated in light of the teachings herein that the use of the heater(s) 80 can significantly alter the characteristics of the ionization chamber (and the underlying physical processes thereof) through rapid desolvation of the solvent and release of the charged ions. In some aspects, for example, the charged ion population in the gap can thus be increased via heating such that the gap behaves as a resistor (e.g., a low temperature plasma) that can efficiently charge the liquid stream and support ion emission currents in excess of 100 nA without arcing, with maximum signal being obtained just below the threshold of bright (Townsend) discharge and without being significantly limited by the ion emission current controllers under normal operating conditions.

Alternatively or in addition to the controlled geometry of the outlet end 42b of the sample needle 42, the mass spectrometer system 10 additionally includes an ion emission controller(s) configured to prevent or limit the outlet end 42b from entering into an avalanche discharge process in which the decrease in the resistance across the gap between the sample needle 42 and the curtain plate 14 increases the ion emission current to the detriment of the reliability/stability of the ESI generated signal and/or the lifespan of a metallized silica capillary (e.g., through erosion of its distal end 42b). Though conventional methods and systems of electrospray ionization have generally attempted to avoid electrical discharge, such techniques typically result in active monitoring/reduction in the voltage of power source and and/or maintaining the ISV at a sub-optimal level during a particular sample run. By way of example, some conventional electrospray ion methods and systems utilize a constant ISV that is below the level of Townsend discharge throughout an entire gradient elution so as to prevent unwanted electrical discharge at periods when electrical discharge is more likely (e.g., when the solvent is particularly conductive, such as when the liquid consists of $H_2O$). However, it will be appreciated that such conventional techniques also reduce the ionization efficiency of the sample at elution times when the solvent is less conductive (i.e., the ISV at these time points could be increased without fear of unwanted discharge). Alternative methods of reducing the power applied to the ion source rely on active operator control, thereby increasing complexity, reducing automation, and/or introducing increased possibility for error.

As noted above and with specific reference now to FIG. 2, the exemplary mass spectrometer system 10 additionally includes an ion emission current controller in accordance with various aspects of the present teachings. It should be appreciated that though the exemplary ion emission controller comprises two exemplary current controlling mechanisms discussed in detail below and collectively referred to herein as an ion emission current controller, these two exemplary mechanisms can be utilized individually or in combination for preventing the onset of unwanted electrical discharge between the sample needle 42 and the curtain plate 14a.

First with reference to the electrical circuit coupling the power source (e.g., HVPS 50) and the sample needle 42, in accordance with various aspects of the present teachings, the exemplary ion emission current controller comprises one or more (e.g., a plurality of) current limiting resistor(s) 52 disposed in series between the power source 50 and the sample needle, wherein the total value of the resistor(s) is configured to clamp the current that the power supply delivers so as to prevent the discharge from releasing an ever increasing number of free charges in a self-feeding avalanche process. In accordance with various aspects, the current limiting resistor(s) 52 can be effective to keep the ion emission current below 10 μA (smaller resistors, e.g., in the MΩ range, can be too low to sufficiently provide a current limit that prevents the onset of discharge), without substantially affecting the operation of the ESI source under normal operating conditions by unnecessarily reducing the voltage of the sample needle 42 for charging the liquid sample. For example, under normal ESI operating conditions of the ion source 40 (e.g., at currents levels from about 0.5 μA to about 2 μA and below threshold levels of Townsend discharge), the electrical resistance of the heated gap between the distal end 42b and the curtain plate 14a can generally be effective to control the supply current through the sample needle 42 (i.e., the ion emission current). For example, in some aspects, the gap can contribute more than about 90% of the total resistance of the electrical circuit between the high voltage power source 50, the sample needle 42, and the curtain plate or counter electrode 14a during normal operation. However, as the threshold for Townsend discharge is approached and dielectric breakdown of the gap causes a decrease in the gap's resistance, the contribution to the overall resistance of the ion emission current circuit by the one or more resistor(s) 52 increases accordingly. In such a configuration in accordance with various aspects of the present teachings, the voltage applied to the sample needle 42 (and the liquid sample) would be reduced accordingly to account for the voltage drop across the resistor(s) 52 at the increased current levels, limiting the ion emission current and preventing runaway discharge without substantially altering the electrical voltage provided to the electrical circuit by the power source (e.g., a 0% change to the magnitude of the output of the voltage source). By way of non-limiting example, in some aspects, the current limiting resistors can exhibit a total resistance in a range from about 20% to about 100% of the resistance of the air gap between the electrospray electrode and the counter electrode under normal operating ESI conditions (e.g., conditions in which ion emission current is generated without electrical discharge between the sample needle 42 and the curtain plate 14*a*). In some aspects, for example, the current limiting resistor(s) can exhibit a total resistance in a range from about 1 to about 3 G.

Figure 3:
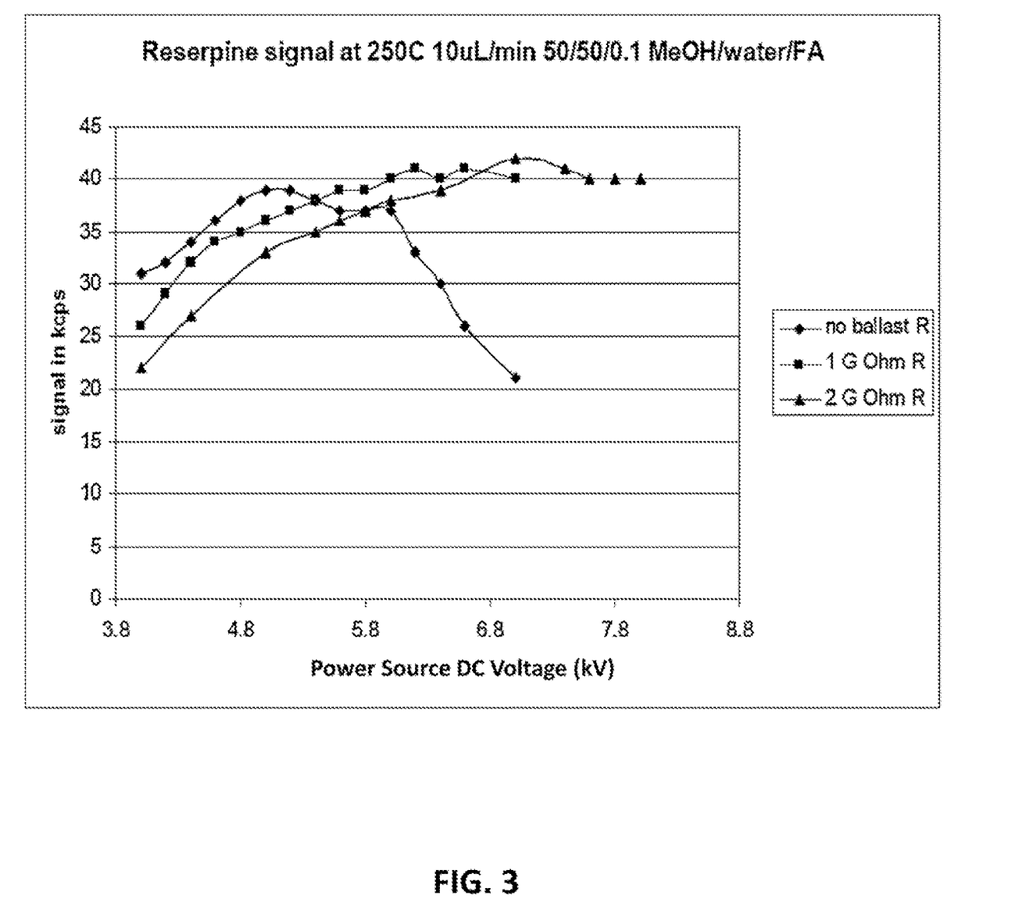
FIG. 3 depicts a plot of the total ions detected by a mass spectrometer system as transmitted by a conventional ion source assembly and ion source assemblies in accordance with various aspects of the applicant's teaching.
Figure 4:
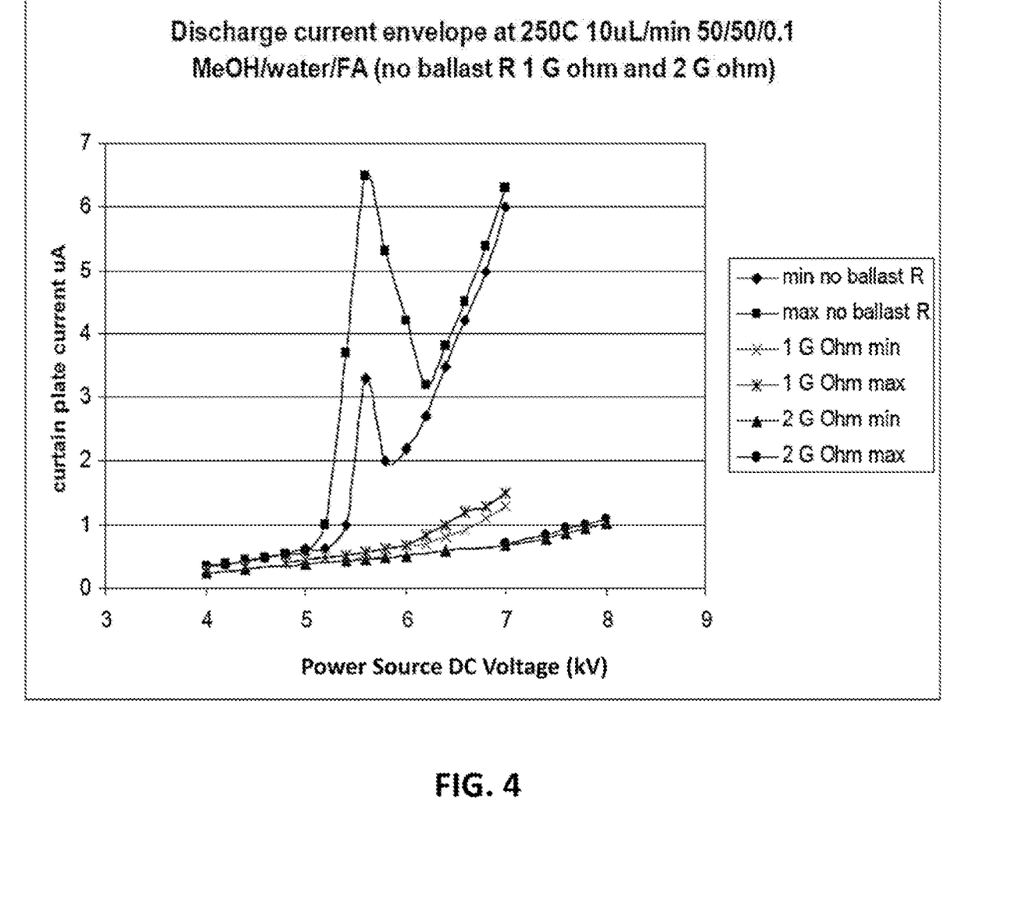
FIG. 4 depicts a plot comparing the curtain plate current in a conventional ion source assembly and ion source assemblies in accordance with various aspects of the applicant's teaching.
Figure 5:
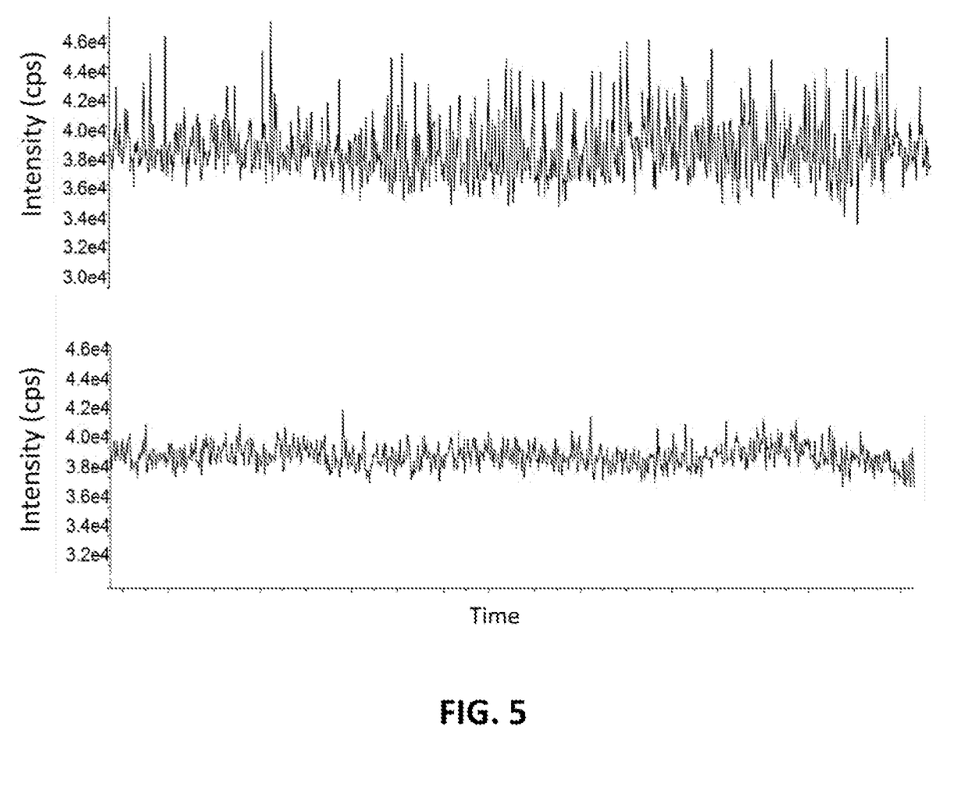
FIG. 5 depicts an ion chromatogram demonstrating the instability of the signal intensity of ions detected by a mass spectrometer as transmitted by a conventional ion source assembly and an ion source assembly in accordance with various aspects of the applicant's teaching.

With reference now to FIGS. 3-5, exemplary data is provided demonstrating the beneficial effect of the exemplary ion emission current controller (i.e., resistor(s) 52) of FIG. 2 discussed directly above. Each of the plots in FIGS. 3-5 was generated utilizing a direct infusion at 10 μL/min of a liquid sample comprising a solution of 50/50/0.1 methanol/water/formic acid spiked with reserpine (10 ng/mL). The ion source was a Turbo V ion source coupled to a API 4000 mass spectrometer (both marketed by SCIEX) operating in flow-through mode and modified in accordance with the present teachings. The curtain plate was maintained at 500V and the ionization chamber was heated to a temperature of 250° C. The various configurations of the ion source in the experimental conditions were identical except for the presence of an additional resistive circuit (i.e., a ballast resistor of 1 GΩ and 2 GΩ) disposed in series between the power source (Bertran 205B-10R) and the sample needle. In this experimental set-up, under normal operating conditions, the air gap between the distal tip of the sample needle and the curtain plate of the mass spectrometer was estimated to be in a range of about 3-5 GΩ, and was reduced to an estimated resistance of about 300-500 MΩ during Townsend discharge.

With specific reference to FIG. 3, the total ion signal of ions generated by the sample source and transmitted through the mass spectrometer operating in flow-through mode are depicted for each of the conditions of no ballast resistor (diamond), a 1 GΩ ballast resistor (square), and a 2 GΩ ballast resistor (triangle) disposed in series between the positive pole of a power source and sample needle, the electric potential of the pole is ramped from about 4.0 kV to about 8.0 kV. As indicated by the drop in the no ballast resistor curve at about 6.0 kV, the intensity of the ions detected diminishes precipitously as the ion source enters the discharge state and as the dielectric gap between the sample needle and the curtain plate breaks down. However, the configuration having both the 1 GΩ and 2 GΩ resistors were effective to maintain a higher ion signal and avoid Townsend discharge well beyond the drop-off voltage of the conventional set-up. With specific reference now to FIG. 4, the amplitude of the minimum and maximum curtain plate current (i.e., the ion emission current) and the difference therebetween was significantly greater for a conventional system (i.e., without a ballast resistor) relative to the systems in accordance with various aspects of the present teachings. That is, the envelope defined by the two no ballast resistor traces (square and diamond) demonstrates that the curtain plate current increases both in magnitude and instability when the liquid delivered into the gap achieves critical desolvation and ion release (e.g., the source setting providing the maximum signal) at a voltage of about 5.4 kV to about 6.0 kV, which demonstrates instability in the signal prior to the general loss of sensitivity depicted in FIG. 3 at about 6.0 kV. With reference now to FIG. 5, which depicts the ion chromatogram for a m/z corresponding to reserpine in a conventional set-up (i.e., no ballast resistor), the lower trace represents ESI signal stability at 5.2 kV (before the plateau in the no ballast resistor trace of FIG. 3). However, even under conditions before the drop-off at about 6.0 kV in the no ballast resistor trace of FIG. 3, the large envelope between the minimum and maximum current in the conventional system as shown in FIG. 4 at about 5.4 kV to about 6.0 kV results in an extremely noisy, unstable signal as demonstrated by the upper trace of FIG. 5. That is, the signal nonetheless becomes "noisier" as its level plateaus for power source voltages greater than about 5.4 kV but less than about 6.0 kV, even before full breakdown (e.g., at the onset of discharge). As noted above with reference to FIG. 3, the discharge continues to increase for voltages above 6.0 kV such that there is also a general loss of signal intensity.

It will thus be appreciated in view of the exemplary data of FIGS. 3-5 that methods and systems in accordance with various aspects of the present teachings can passively maintain the electrospray electrode at relatively high ISVs so as to provide maximal ionization efficiency, while nonetheless reducing the risk of unwanted electrical discharge. Moreover, it will be appreciated that methods and systems in accordance with various aspects of the present teachings can allow the ESI ionization process to access higher uniform fields to enhance performance (e.g., for difficult to ionize compounds and conditions) and/or can provide improvements in the ease of use, ease of tuning, signal stability, sensitivity, and robustness (in both signal and electrode longevity).

With reference again to FIG. 2, the exemplary mass spectrometer system 10 can additionally or alternatively include an ion emission current controller 30 that can be effective to control ion emission currents by taking into account changes in operating conditions of the ion source assembly due to changes in the identity of the liquid sample source. As noted above, the system 10 can be fluidly coupled to and receive a liquid sample from a sample source 20 such as a reservoir of the sample to be analyzed, an input port through which the sample can be injected (e.g., manually or via an auto-sampler), or an LC column (e.g., of an HPLC system), for example, via one or more fluid conduits 34 extending between the sample source 20 and the inlet end 42*a* of the sample needle 42. As shown in FIG. 2, in various aspects of the present teachings the ion emission controller 30 can comprise a conductive electrode 32*a* disposed in electrical communication with the sample liquid to be delivered from the sample source at a distance away from the conductive portion of the sample needle 42 (e.g., at a location between the output end 20*a* of a liquid chromatography column and the inlet end 42*a* of the sample needle). The electrode 32*a* can be coupled to a voltage source (not shown) or can be grounded as shown schematically in FIG. 2, for example. It will thus be appreciated in light of the present teachings that when an ion source voltage is applied to the conductive sample needle 42 through which the fluid sample flows, the sample fluid in the fluid path between the electrode 32*a* and the sample needle can conduct a current the magnitude of which depends at least partially on the conductivity of the fluid sample, the potential difference between the electrode 32*a*, and the separation distance between the conductive portion of the sample needle 42 in electrical contact with the sample liquid and the electrode 32*a*. It will further be appreciated in light of the present teachings that for a given potential difference (e.g., the difference between a constant ISV applied to the sample needle 42 and ground) and for a given separation distance, the electrical current between the sample needle 42 and electrode 32a would be greater when the conductivity of the liquid sample is higher (i.e., less resistive) as compared to relatively lower conductivity liquid samples (i.e., more resistive). In this manner, the electrode 32a can act as a shunt that reduces the ion emission current across the gap by diverting at least a portion to the electrode 32a. Moreover, the electrode 32a would be effective to preferentially reduce the ion emission current under conditions in which the liquid sample is more conductive, and thus more likely to cause the onset of discharge. Thus, whereas conventional electrospray ion methods and systems typically anchor the ISV to a value that is safely below the likely level of Townsend discharge at periods during a sample run when electrical discharge is most likely to occur (e.g., during a gradient elution with high conductivity solvents), various aspects of the present teachings can passively adjust the ion emission current to help avoid the onset of discharge without unnecessarily reducing ionization efficiency by maintaining an ISV at sub-optimal voltages during periods of a sample run in which electrical discharge is less likely. That is, systems and methods in accordance with the present teachings can account for conductivity variations of the liquid over time from highly conductive liquids (e.g., $H_2O$) to less-conductive solvents (e.g., organic solvents, alcohol), and mixtures thereof.

Figure 6:
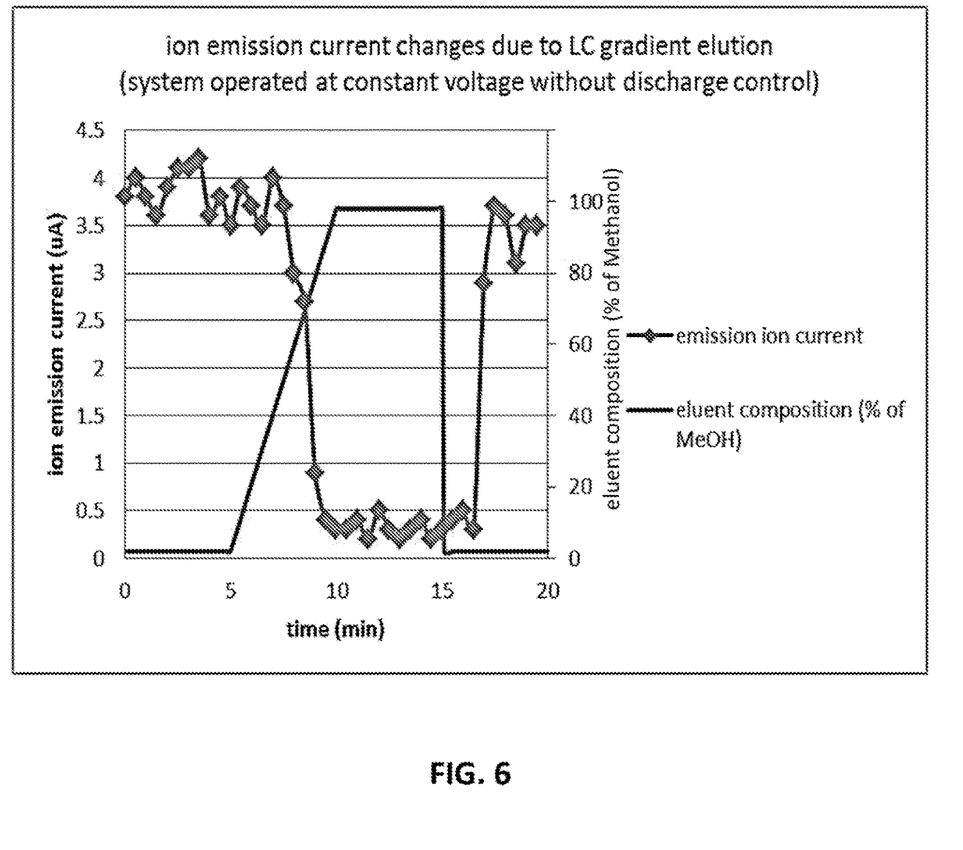
FIG. 6 depicts the changes in an ion emission current over the course of an exemplary LC gradient elution, sample run with a conventional ion source
Figure 7:
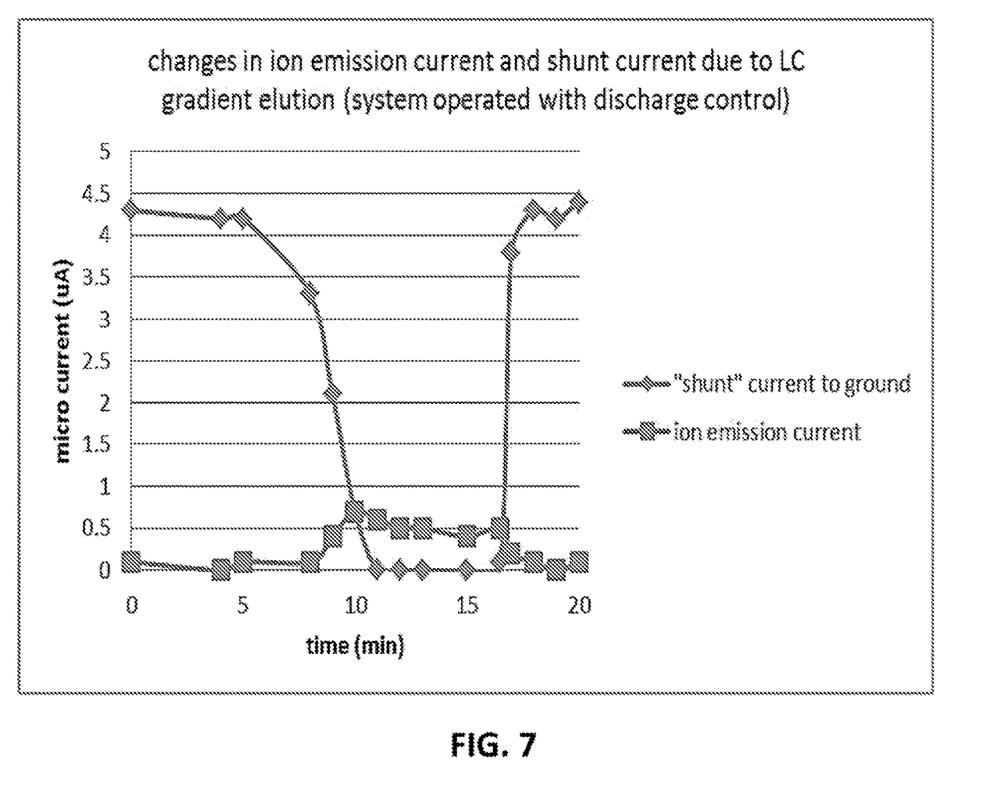
FIG. 7 depicts the changes in an ion emission current and the diverted "shunt" current over the course of exemplary LC gradient elution, sample run with an ion source assembly in accordance with various aspects of the applicant's teachings

The above is illustrated by way of non-limiting example by FIGS. 6 and 7, which represent sample delivered to the ion source 40 of FIG. 2 (sample needle 42) by a gradient elution from an LC column. During gradient elution, a binary mixture (typically water and methanol) can be formed by a set of pumps which are programmed to deliver a precise composition that may change over the course of a sample run (eluant composition trace in FIG. 6). An exemplary sample run consists of a number of essential steps: i) a retention step which allows separation of the analytes from interfering salts (0-5 min., eluant composition trace FIG. 6, 98% water/2% methanol); ii) next, a linear increase of the methanol content which separates the individual analytes in time (5-10 min., eluant composition trace in FIG. 6); iii) next, the LC column clean-up step that removes highly retained components (10-15 min., eluant composition trace in FIG. 6, 98% methanol/2% water); and iv) LC column re-equilibration that prepares the column for next sample run (15-20 min., eluant composition trace in FIG. 6, 98% water/2% methanol). During these steps, the sample analytes are typically detected by the mass spectrometer in steps ii) and iii). During this process, the changing composition of the liquid inside the fluid conduit 34 and sample needle 42 changes the electrical conductivity of that path, in effect making it a variable resistor whose resistance follows the programmed mixing of the binary components of the liquid. At the first and last steps of the sample run, the fluid is mostly water and thus more conductive, allowing greater current at the sample needle distal end 42b and higher ion emission current therefrom. The diamond trace in FIG. 6 depicts an exemplary ion emission current in a system with no discharge control as discussed otherwise herein and shows discharge (at about 4 µA) over the first and last steps as the ion source voltage is set to provide optimal sample ionization over the second and third steps of the sample run (with ion emission current about 0.5 µA, non-discharging). Such operation while achieving optimal analyte ionization can be detrimental to the sample needle 42 and the distal end 42b in particular, severely shortening its lifespan. In contrast, applying various aspects of the present teachings in a set up as depicted in FIG. 2 reduced the ion emission current below discharge level over all the steps of the sample run as shown in FIG. 7 (square trace), while operating at the same ion source voltage as in FIG. 6 (5.8 kV). A combination of setting the electrode 32a at ground potential, the length of the fluid conduit 34 between the electrode 32a and the sample needle 42 at 30 cm of 0.05 mm ID tubing together with a current limiting resistor 52 of 1 GΩ was effective to reduce the ion emission current over the first and last steps of the sample run while maintaining the optimal ionization in steps 2 and 3. The reduction in ion emission current is illustrated by the "shunt" current removed to ground by the electrode 32a (diamond trace in FIG. 7). That is, the electrode 32a in electrical communication with the sample fluid is effective to act as an electrical split that is controlled by the changing conductivity of the fluid, such that current is diverted from the sample needle 42 over the parts of the LC gradient which are most prone to discharge and unimportant for sample analysis, while shutting off or reducing the "shunt" current split over the parts of the LC gradient when discharge is less likely and analytes are detected. The work was performed on API 4000 mass spectrometer system equipped with Turbo V ion source. The ion source was operated at 300° C. and the LC flow rate was 5 µL/min.

In various aspects as schematically depicted in FIG. 2, the system can additionally include one or more additional electrodes (e.g., electrode 32b) that can be selectively coupled to ground (or a voltage source), for example, via an electrical switch under the control of a controller (not shown). Accordingly, the separation distance between the conductive portion of the sample needle 42 in electrical contact with the sample liquid and the electrode 32a can be adjusted so as to adjust the magnitude of the current that can be diverted from the ion emission current, depending on the conductivity of the liquid sample, for example.

Methods for operating an electrospray ion source of a mass spectrometer system are also provided herein in accordance with various aspects of the present teachings. By way of example, method for operating an electrospray ion source can comprise transmitting a liquid sample from an inlet end of an electrospray electrode to an outlet end of the electrospray electrode, the outlet end being disposed in an ionization chamber so as to discharge the liquid sample from the outlet end of the electrospray electrode into the ionization chamber, the ionization chamber being in fluid communication with a sampling orifice formed in (e.g., extending through) a counter electrode of a mass spectrometer system; heating the ionization chamber; operating a power source to provide an electrical power to an electrical circuit containing the electrospray electrode and the counter electrode so as to generate an ion emission current between the electrospray electrode and the sampling orifice as at least a portion of the liquid sample is ionized upon being discharged from the electrospray electrode; and controlling the ion emission current so as to limit the onset of electrical discharge between the electrospray electrode and the counter electrode without substantially altering the electrical potential (voltage, electromotive force) provided to the electrical circuit by the power source. In some aspects, the emission current can be maintained in a range of about 0.5 µA to about 10 µA (e.g., in a range between about 0.5 µA to about 3 µA), while the flow rate of the liquid sample from the electrospray electrode can be maintained in a range of less than 1 mL/min (e.g., in a range of about 1 µL/min to about 100 µL/min).

The ion emission current can be controlled in a variety of manners in accordance with various aspects of the present teachings. By way of example, one or more current limiting resistors disposed in series in the electrical circuit between the power source and the electrospray electrode can limit the onset of electrical discharge. In some related aspects, the one or more current limiting resistors can exhibit a total resistance in a range from about 1 to 3 GΩ Additionally or alternatively, the one or more current limiting resistors exhibit a total resistance in a range from about 20% to about 100% of the resistance of the air gap between the electrospray electrode and the counter electrode under normal operating conditions of the ion source in which ion emission current is generated without electrical discharge between the electrospray electrode and the counter electrode.

In various aspects, the ion emission current can additionally or alternatively be controlled via a shunt electrode disposed upstream from the inlet end of the electrospray electrode and in electrical communication with the liquid sample that is configured to limit the onset of electrical discharge by diverting at least a portion of the electrical current between the electrospray electrode and the sampling orifice to the shunt electrode. In related aspects, for example, a distance between the shunt electrode and the electrospray electrode can be adjusted so as to adjust the diverted current. By way of example, the distance can be based on the conductivity of the liquid sample.

The section headings used herein are for organizational purposes only and are not to be construed as limiting. While the applicant's teachings are described in conjunction with various embodiments, it is not intended that the applicant's teachings be limited to such embodiments. On the contrary, the applicant's teachings encompass various alternatives, modifications, and equivalents, as will be appreciated by those of skill in the art.

What is claimed is:

1. An electrospray ion source assembly for generating ions for analysis by a mass spectrometer, comprising:
    an ion source housing defining an ionization chamber, the ionization chamber configured to be disposed in fluid communication with a sampling orifice of a mass spectrometer system, the sampling orifice formed in a counter electrode;
    at least one heater for heating the ionization chamber;
    an electrospray electrode defining an axial bore therethrough for transmitting a liquid sample received from a sample source at an inlet end of the electrospray electrode to an outlet end for discharging the liquid sample from the electrospray electrode into the ionization chamber;
    a power source configured to provide an electrical voltage to an electrical circuit containing the electrospray electrode and the counter electrode so as to generate an ion emission current between the electrospray electrode and the sampling orifice as at least a portion of the liquid sample is ionized upon being discharged from the electrospray electrode; and
    the ion emission current configured to limit the onset of electrical discharge between the electrospray electrode and the counter electrode without substantially altering the electrical voltage provided to the electrical circuit by the power source, by:
    a shunt electrode disposed between an LC column and the outlet end of the electrospray electrode, the shunt electrode configured to be in electrical communication with the liquid sample, wherein at least a portion of the electrical current between the power source and the electrospray electrode is diverted to the shunt electrode based on the conductivity of the portion of the liquid sample between the outlet end of the electrospray electrode and the shunt electrode.

2. The electrospray ion source assembly of claim 1, wherein the shunt electrode comprises a plurality of shunt electrodes disposed at different distances upstream from the inlet end of the electrospray electrode, wherein one of the plurality of the shunt electrodes is selectively grounded based on the conductivity of the liquid sample.

3. The electrospray ion source assembly of claim 1, wherein the electrospray electrode comprises a metallized silica capillary.

4. The electrospray ion source assembly of claim 3, wherein the shape of the outlet end of the electrospray electrode is controlled so as to reduce the electric field thereat.

5. The electrospray ion source assembly of claim 1, wherein the ion emission current is below about 10 µA.

6. The electrospray ion source assembly of claim 1, wherein the ion emission current is in a range of about 0.5 µA to about 10 µA.

7. The electrospray ion source assembly of claim 1, wherein a flow rate of the liquid sample in the electrospray electrode is maintained in a range of less than 1 mL/min.

8. The electrospray ion source assembly of claim 1, wherein the power source is configured to provide a DC voltage in a range of about 2000 V to about 6000 V to the electrospray electrode.

9. A mass spectrometer system, comprising:
    a liquid chromatography (LC) column for providing a liquid sample to be analyzed;
    an electrospray ion source in fluid communication with the LC column, the electrospray ion source comprising:
        an ion source housing defining an ionization chamber;
        at least one heater for heating the ionization chamber;
        an electrospray electrode defining an axial bore therethrough for transmitting a liquid sample received from a sample source at an inlet end of the electrospray electrode to an outlet end for discharging the liquid sample from the electrospray electrode into the ionization chamber; and
    a mass analyzer for analyzing the ions generated by the ion source, wherein the ions are received by the mass analyzer through a sampling orifice in a counter electrode, the sampling orifice being in fluid communication with the ionization chamber;
    a power source configured to provide an electrical voltage to an electrical circuit containing the electrospray electrode and the counter electrode so as to generate an ion emission current between the electrospray electrode and the sampling orifice as at least a portion of the liquid sample is ionized upon being discharged from the electrospray electrode; and
    the ion emission current configured to prevent arcing between the electrospray electrode and the counter electrode without substantially altering the electrical voltage provided to the electrical circuit by the power source, by:
    a shunt electrode disposed between the LC column and the outlet end of the electrospray electrode, the shunt electrode configured to be in electrical communication with the liquid sample, wherein at least a portion of the electrical current between the power source and the electrospray electrode is diverted to the shunt electrode based on the conductivity of the portion of the liquid sample between the outlet end of the electrospray electrode and the shunt electrode.

10. The mass spectrometer system of claim 9, wherein ion emission current is below about 10 µA without substantially altering the voltage provided by the power source.

11. A method for operating an electrospray ion source of a mass spectrometer system, the method comprising:
transmitting a liquid sample from an inlet end of an electrospray electrode to an outlet end of the electrospray electrode, the outlet end being disposed in an ionization chamber so as to discharge the liquid sample from the outlet end of the electrospray electrode into the ionization chamber, the ionization chamber being in fluid communication with a sampling orifice formed in a counter electrode of a mass spectrometer system;
heating the ionization chamber;
operating a power source to provide an electrical voltage (electromotive force) to an electrical circuit containing the electrospray electrode and the counter electrode so as to generate an ion emission current between the electrospray electrode and the sampling orifice as at least a portion of the liquid sample is ionized upon being discharged from the electrospray electrode; and
controlling the ion emission current so as to limit the onset of electrical discharge between the electrospray electrode and the counter electrode without substantially altering the electrical voltage provided to the electrical circuit by the power source, by:
providing a shunt electrode disposed between an LC column and the outlet end of the electrospray electrode, the shunt electrode configured to be in electrical communication with the liquid sample, wherein at least a portion of the electrical current between the power source and the electrospray electrode is diverted to the shunt electrode based on the conductivity of the portion of the liquid sample between the outlet end of the electrospray electrode and the shunt electrode.

12. The method of claim 11, wherein controlling the ion emission current comprises adjusting a distance between the shunt electrode and the electrospray electrode, wherein the distance is based on the conductivity of the liquid sample.

13. The method of claim 11, wherein the ion emission current is maintained in a range of about 0.5 µA to about 10 µA.

14. The method of claim 11, wherein the electrospray electrode comprises a metallized silica capillary.

15. The method of claim 11, wherein the shape of the outlet end of the electrospray electrode is controlled so as to reduce the electric field thereat.

16. The method of claim 11, wherein a flow rate of the liquid sample in the electrospray electrode is maintained in a range of less than 1 mL/min.

17. The method of claim 11, wherein the power source is configured to provide a DC voltage in a range of about 2000 V to about 6000 V to the electrospray electrode.

* * * * *